(12) United States Patent
Yang

(10) Patent No.: US 9,751,581 B2
(45) Date of Patent: Sep. 5, 2017

(54) ASSEMBLED DUAL-USE BALANCE CAR

(71) Applicant: Zunyi Yang, Yueqing (CN)

(72) Inventor: Zunyi Yang, Yueqing (CN)

( * ) Notice: Subject to any disclaimer, the term of this patent is extended or adjusted under 35 U.S.C. 154(b) by 0 days.

(21) Appl. No.: 15/149,184

(22) Filed: May 9, 2016

(65) Prior Publication Data

US 2017/0158275 A1 Jun. 8, 2017

(30) Foreign Application Priority Data

Dec. 8, 2015 (CN) .................... 2015 2 1007600 U

(51) Int. Cl.
  *B62M 7/12* (2006.01)
  *B62K 3/00* (2006.01)
  *B62K 21/16* (2006.01)
(52) U.S. Cl.
  CPC .............. *B62K 3/007* (2013.01); *B62K 21/16* (2013.01)
(58) Field of Classification Search
  CPC .. B62K 11/007; B62K 2204/00; B62K 21/12; B62K 3/007; B62D 51/02; B60L 2260/34
  See application file for complete search history.

(56) References Cited

U.S. PATENT DOCUMENTS

| 9,403,573 B1* | 8/2016 | Mazzei | B62D 51/02 |
| 2013/0238231 A1* | 9/2013 | Chen | B62K 11/007 |
| | | | 701/124 |
| 2014/0008138 A1* | 1/2014 | Kim | B60L 11/1877 |
| | | | 180/216 |
| 2016/0101823 A1* | 4/2016 | Chang | B62K 5/01 |
| | | | 180/6.5 |
| 2016/0325803 A1* | 11/2016 | Waxman | B62M 7/12 |

* cited by examiner

*Primary Examiner* — Brian Swenson

(57) ABSTRACT

An assembled dual-use balance car, comprises balance car body comprising a first foot board, a second foot board, a first and a second wheel, a first and a second motor respectively, and a balance control system, the balance car body being moved forward, draw back, and turns by tilting the first and second foot board forward and backward, and rotating around each other; a steering assembly comprising a locking part configured to prevent the first and second foot board from being rotating around each other, and a sensor assembly disposed at a bottom end of the steering rod and configured as a steering control of the balance car body, the sensor assembly being electrically connected with the balance control system; the steering assembly can be assembled and disassembled flexibly in the assembled dual-use balance car based on actual using situation.

10 Claims, 5 Drawing Sheets

ASSEMBLED DUAL-USE BALANCE CAR

CROSS-REFERENCE TO RELATED APPLICATION

The application claims the priority benefit of China application serial No. 201521007600.7, filed on Dec. 8, 2015. The entirety of the above-mentioned patent application is hereby incorporated by reference herein and made a part of this specification.

FIELD OF THE INVENTION

The present invention relates to technical field of a balance ca particularly to an assembled dual-use balance car.

BACKGROUND OF THE INVENTION

With the development of electric vehicles and the improvement of people's living standards, the electric car has become our daily transportation, especially the two wheel balance car is more practical for sightseeing or patrol.

The balance car of the prior art generally includes a first foot board, a second foot board connected and mutually rotated with the first foot board, a first wheel disposed at one end of the first food board, a second wheel disposed at one end of the second food board, a first motor installed in the first foot board and independently driving the first wheel, a second motor installed in the second foot board and independently driving the second wheel, and a balance control system installed in the first foot board or the second foot board; wherein the balance car body is moved forward, draw back, and turns by tilting the first and second foot board forward and backward, and rotating around each other.

The above-mentioned balance car is suitable use in flat ground, the structure of which is simple, it brings more fun and is well received by consumers. However, the balance car may have a big challenge to drive on uneven ground, it could cause users to fall out, and there is a big security risk.

In view of the above mentioned description, present invention provides the following technical scheme.

SUMMARY OF INVENTION

The present invention aims overcome the deficiency of the technology, providing an assembled dual-use balance car.

For solving the above mentioned problems, the present invention adopts a first technical scheme: an assembled dual-use balance car, comprising:

a balance car body, comprising a first foot board, a second foot board connected and mutually rotated with the first foot board, a first wheel disposed at one end of the first food board, a second wheel disposed at one end of the second food board, a first motor installed in the first foot board and independently driving the first wheel, a second motor installed in the second foot board and independently driving the second wheel, and a balance control system installed in the first foot board or the second foot board; wherein the balance car body is moved forward, draw back, and turns by tilting the first and second foot board forward and backward, and rotating around each other;

a steering assembly, installed on and capable of being dissembled from the balance car body, comprising a locking part configured to prevent the first and second foot board from being rotating around each other, a steering rod installed on the locking part, and a sensor assembly disposed at a bottom end of the steering rod and configured as a steering control of the balance car body, the sensor assembly being electrically connected with the balance control system;

wherein the balance car body can be used independently without the steering assembly, and also can be used together with the steering assembly.

Furthermore, wherein the steering assembly further comprises a first holder and a second holder respectively installed in back sides and front sides of the first and second foot board; wherein the steering rod and the locking part are installed on the second holder, and the locking part passes through the first and second foot board, and then is fixed with the first holder.

Furthermore, wherein the locking part is a fork-shaped metal, a middle part of which is fixed with the second holder and two ends of which passes through a first metal base and a second metal base respectively installed inside the first and second foot board to connect with the first holder for preventing the first and second foot board from being rotated around each other.

Furthermore, wherein the first holder and the second holder respectively comprise at least two fasteners disposed on inner sides thereof; wherein the first and second foot board respectively comprise at least two grooves disposed in the front and back side thereof, and corresponding to the fasteners; the first and second holder are coupled to the first and second foot board via the fasteners fixing in the grooves.

Furthermore, wherein the steering rod defines an extendable rod.

Furthermore, wherein the steering rod comprises a handlebar installed on an upper end thereof and configured to control the balance car body with hands.

Furthermore, wherein the steering rod comprises knee pads disposed in the upper end thereof and configured to control the balance car body with legs.

For solving the above mentioned problems, the present invention adopts a second technical scheme: an assembled dual-use balance car, comprising:

a balance car body, comprising a first foot board, a second foot board connected and mutually rotated with the first foot board, a first wheel disposed at one end of the first food board, a second wheel disposed at one end of the second food board, a first motor installed in the first foot board and independently driving the first wheel, a second motor installed in the second foot board and independently driving the second wheel, a first balance control system installed in the first foot board, and a second balance control system installed in the second foot board; wherein the balance car body is moved forward, draw back, and turns by tilting the first and second foot board forward and backward, and rotating around each other; wherein the first foot board and the second foot board respectively comprise a first pressure sensor and a second pressure sensor configured as a start switch;

a steering assembly, installed on and capable of being dissembled from the balance car body, comprising a locking part configured to prevent the first and second foot board from being rotating around each other, a steering rod installed on the locking part, and a sensor assembly disposed at a bottom end of the steering rod and configured as a steering control of the balance car body, the sensor assembly being electrically connected with the balance control system;

wherein the balance car body can be used without the steering assembly, and also can be used together with the steering assembly.

Furthermore, wherein the first foot board comprises a first housing and a first mat fixed on the first housing; wherein the first balance control system and the first motor are installed in the first housing, and the first pressure sensor is installed on an upper surface oaf the first housing and is covered thereon by the first mat.

Furthermore, wherein the second board comprises a second housing and a second mat fixed on the second housing; wherein the second pressure sensor and the second motor are installed in the second housing, and the second pressure sensor is installed on an upper surface of the second housing and is covered thereon by the second mat.

After adopting the above technical scheme, the present invention has the following advantages compared to the prior art: the balance car body can be used without the steering assembly on flat ground, which will bring more fun to users; the balance car body also can be used with the steering assembly to improve the maneuver stability, when using on uneven road. Therefore, the present invention can be based on actual ground situation to use the balance car body independently, or use with the steering assembly, thereby conforming with the demand for enhancing economic benefits of products.

The first foot board and the second foot board sense pressure value thereabove through the first and second pressure sensor, when the pressure value is beyond the predetermined pressure value of the corresponding balance control system, the corresponding balance control system will be started to work, thereby simplifying the structure of the balance car, reducing cost of manufacture, and increasing operational stability.

DETAILED DESCRIPTION OF THE PREFERRED EMBODIMENTS

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

A First Embodiment

Figure 1:
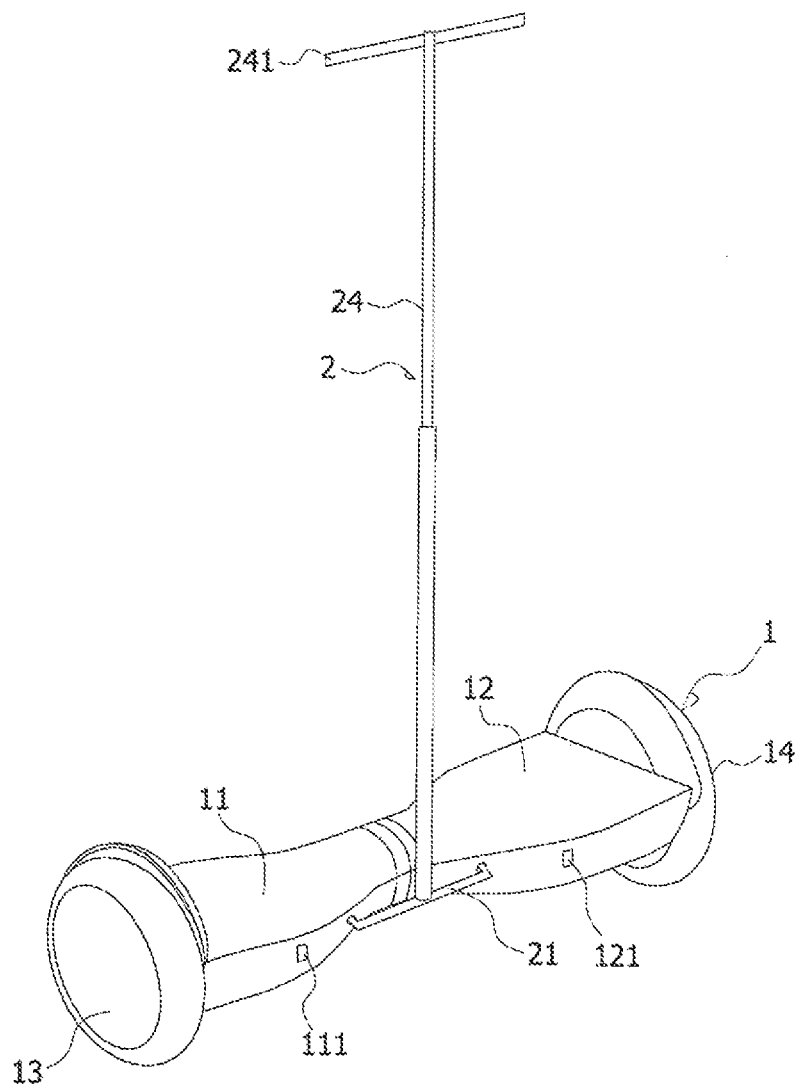
FIG. 1 is a structural schematic view of a first embodiment of the present invention.
Figure 2:
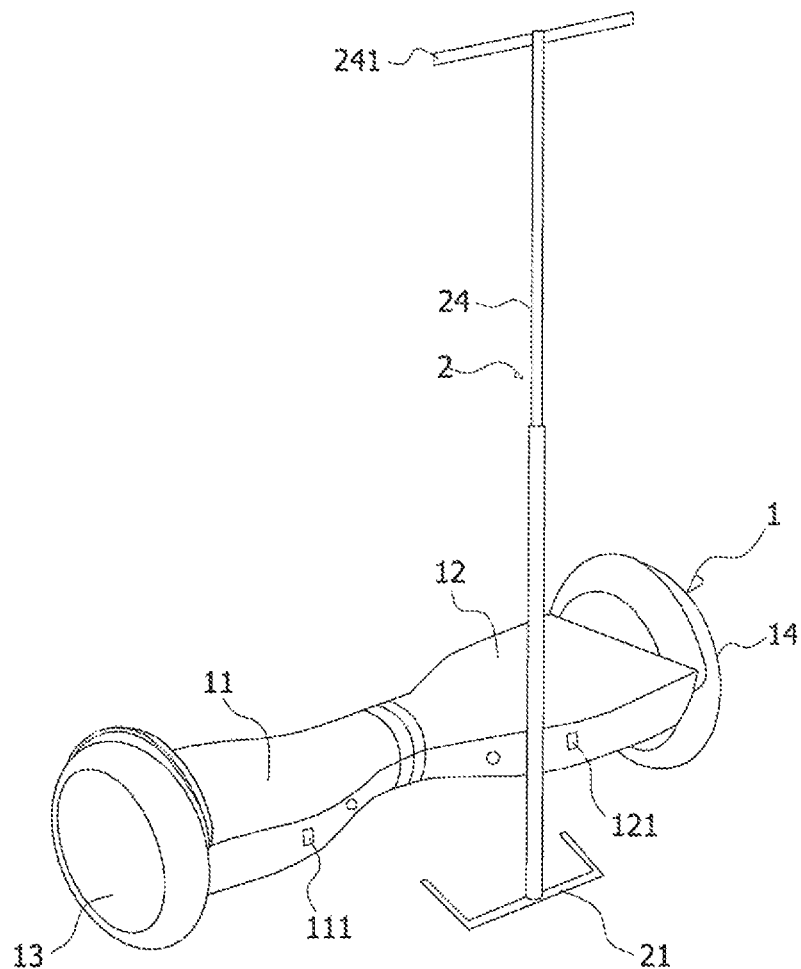
FIG. 2 is an exploded view of FIG. 1.

An assembled dual-use balance car in FIG. 1 and FIG. 2, comprising: a balance car body (1) and a steering assembly (2) installed on and capable of being dissembled from the balance car body (1); the balance car is a complete structure which can be used without the steering assembly (2) and also can be used together with the steering assembly (2) according to user's requirement.

The balance car body (1), comprising a first foot board (11), a second foot board (12) connected and mutually rotated with the first foot board (11), a first wheel (13) disposed at one end of the first food board (11), a second wheel (14) disposed at one end of the second food board (12), a first motor (101) installed in the first foot board (11) and independently driving the first wheel (13), a second motor (102) installed in the second foot board (12) and independently driving the second wheel (14), and a balance control system installed in the first foot board (11) or the second foot board (12); wherein the balance car body (1) is moved forward, draw back, and turns by tilting the first and second foot board (11, 12) forward and backward, and rotating around each other. According to above mentioned structure, the balance car body (1) can be used independently;

The steering assembly (2) installed on and capable of being dissembled from the balance car body (1), comprising a locking part (21) configured to prevent the first and second foot board (11, 12) from rotating around each other, a steering rod (24) installed on the locking part (21), and a sensor assembly (240) disposed at a bottom end of the steering rod (24) and configured to steer the balance car body (1), the sensor assembly (240) being electrically connected with the balance control system, so that the steering rod (24) can control the balance car body (1) to turn right and left;

wherein the locking part (21) is a fork-shaped metal, two ends of which are inserted into and connected therewith a first metal base and a second metal base respectively installed in the first and second foot board (11, 12) thereby forming a stable connection;

Wherein the steering rod (24) is an extendable rod, which comprises a handlebar (241) disposed in an upper end thereof and configured to control the balance car body (1) with hands. In particular, the balance car body (1) turns right or left by tilting the handlebar (241) to the right or left.

To sum up, the balance car body (1) can be used without the steering assembly (2) on flat ground, which will bring more fun to users; the balance car body (1) also can be used with the steering assembly (2) to improve the maneuver stability, when using on uneven road. Therefore, the present invention can be based on actual ground situation to use the balance car body (1) independently, or use with the steering assembly (2), thereby conforming with the demand for enhancing economic benefits of products.

A Second Embodiment

Figure 3:
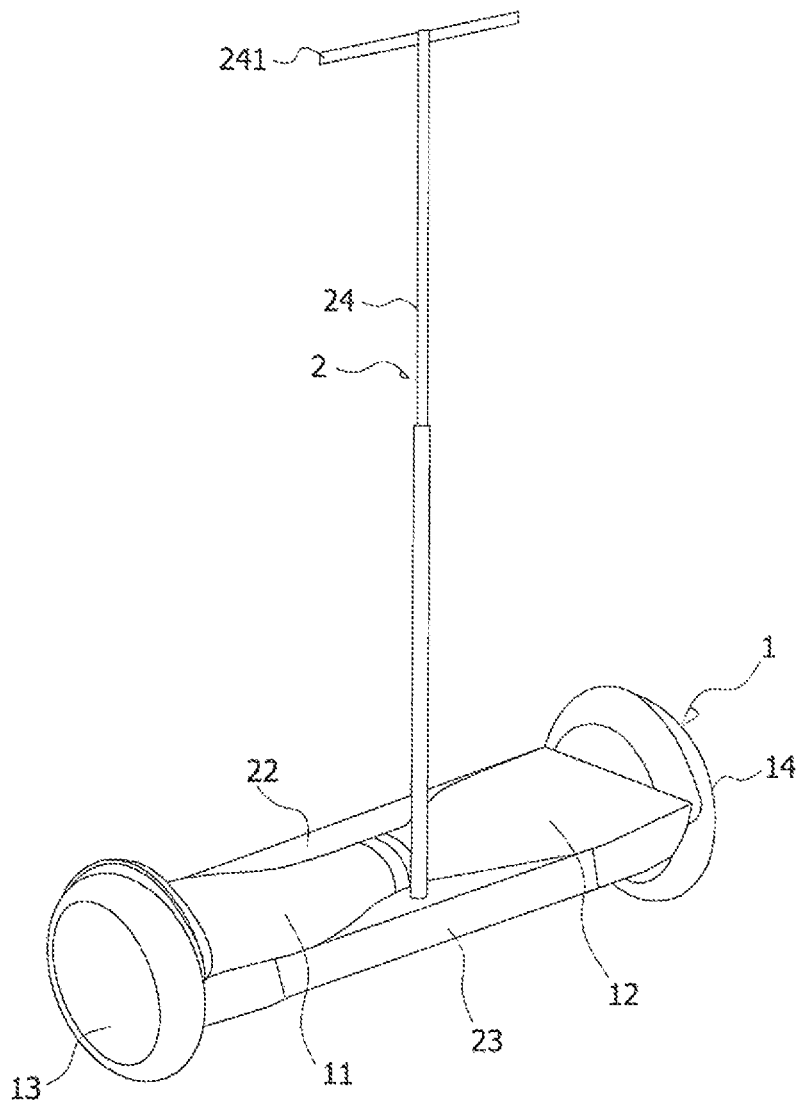
FIG. 3 is a structural schematic view of a second embodiment of the present invention.
Figure 4:
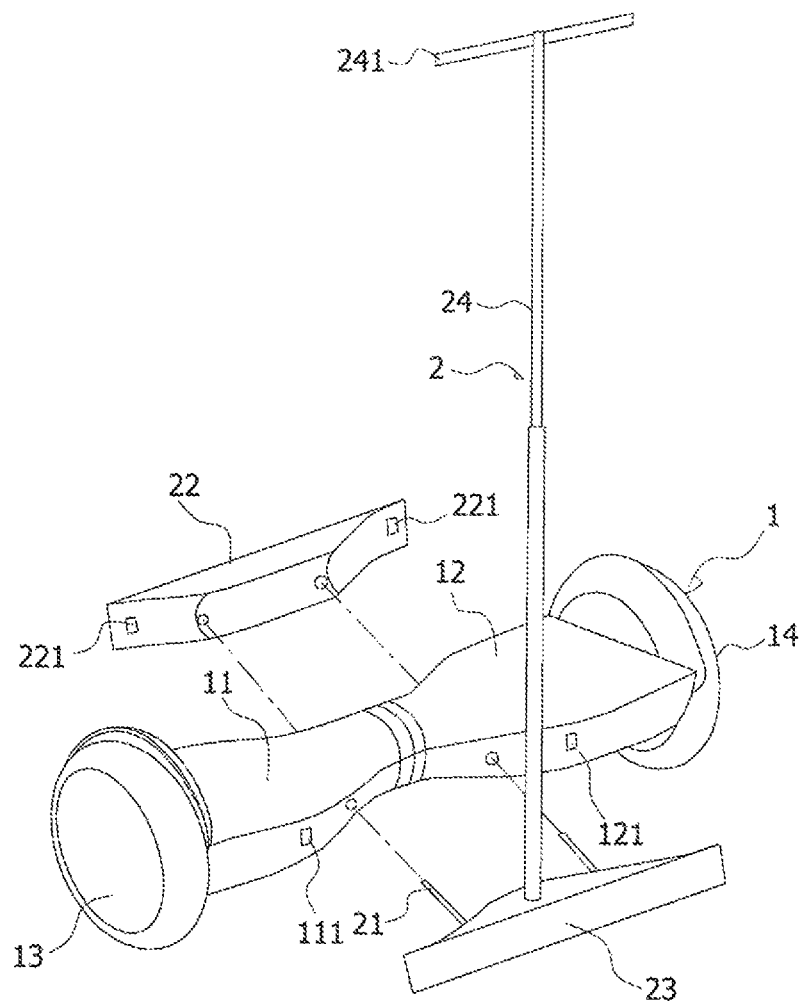
FIG. 4 is an exploded view of FIG. 3.

Referring to FIGS. 3 and 4, the second embodiment differed from the first embodiment is that the steering assembly (2) further comprises a first holder (22) and a second holder (23) installed in back sides and front sides of the first and second foot board (11, 12), respectively; wherein the steering rod (24) and the locking part (21) are installed on the second holder (23), and the locking part (23) passes through the first and second foot board (11,12), and then is fixed with the first holder (22).

the locking part (21) is the fork-shaped metal, the middle part of which is fixed in the second holder and the two ends of which pass through the first metal base and the second metal base respectively installed in the first and second foot board (11, 12) to couple with the first holder (22) for preventing the first and second foot board (11,12) from being rotated around each other. Besides, the locking part (21) can be any other form of connector structure, as long as the connector structure can be fixed between the first and second foot board (11, 12) to prevent therebetween from being rotated around each other, and also can be coupled between the first holder (22) and the second holder (23).

wherein the first holder (22) comprises at least two first fasteners (221) disposed on inner sides thereof; wherein the first and second foot board (11, 12) comprises two first grooves positioned in the back sides thereof and being compatible with the first fasteners (221); the first holder (22) is coupled to the first and second foot board (11, 12) via two first fasteners (221) being fixed in the first grooves. Besides, the second holder (23) comprises at least two second fasteners disposed on inner sides thereof; wherein the first and second foot board (11, 12) comprises two second grooves (111, 121) positioned in the front sides thereof and being compatible with the second fasteners; the second holder (23) is coupled to the first and second foot board (11, 12) via two second fasteners being fixed in the second grooves (111, 121).

Except the above mentioned features, the other structure of the second embodiment is the same as that of the first embodiment, here I will not go further on this point. The structure of the second embodiment is more stable and the technical effect is also the same as the first embodiment.

A Third Embodiment

Figure 5:
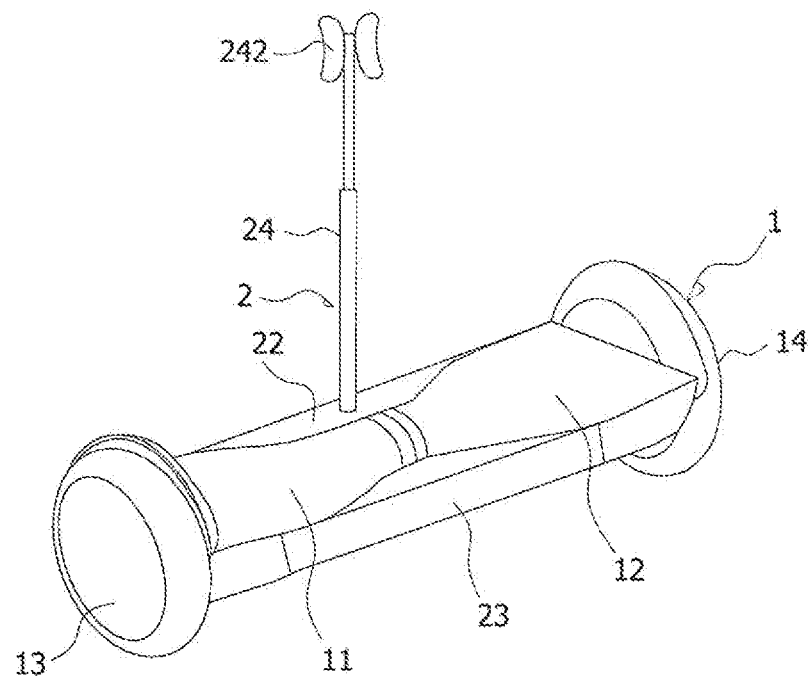
FIG. 5 is a structural schematic view of a third embodiment of the present invention.
Figure 6:
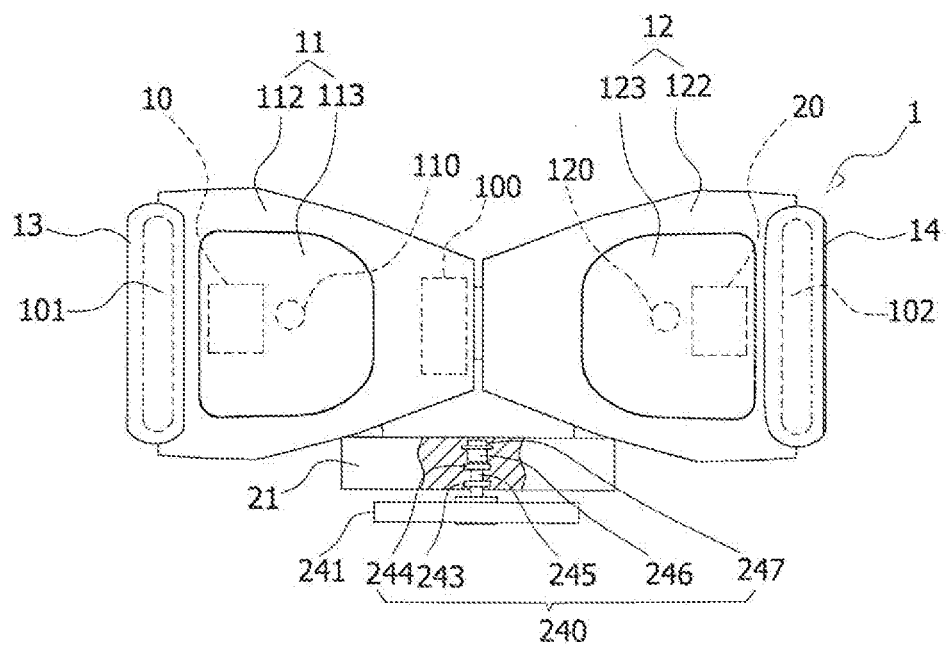
FIG. 6 is a structural schematic view of a fourth embodiment of the present invention.

Referring to FIG. 5, the third embodiment differed the second embodiment is that the steering rod (24) comprises knee pads (242) disposed in the upper end thereof and configured to control the balance car body with legs. Except the above mentioned feature, the structure of the third embodiment is the same as that of the second embodiment and the technical effect is also the same as the second embodiment.

A Fourth Embodiment

An assembled dual-use balance car in FIG. 1 and FIG. 2 comprising: a balance car body (1) and a steering assembly (2) installed on and capable of being dissembled from the balance car body (1); the balance car is a complete structure which can be used without the steering assembly (2) and also can be used together with the steering assembly (2) according to user's requirement.

The balance car body (1), comprising a first foot board (11), a second foot board (12) connected and mutually rotated with the first foot board (11), a first wheel (13) disposed at one end of the first food board (13), a second wheel (14) disposed at one end of the second food board (12), a first motor (101) installed in the first foot board (11) and independently driving the first wheel (13), a second motor (102) installed in the second foot board (12) and independently driving the second wheel (14), a first balance control system (10) installed in the first foot board (11), and a second balance control system (20) installed in the second foot board (12); wherein the balance car body (1) is moved forward, draw back, and turns by tilting the first and second foot board (11, 12) forward and backward, and rotating around each other. According to above mentioned structure, the balance car body (1) can be used independently. The first foot board (11) comprises a battery (100) electrically connected with the first and second balance control system (10, 20), and the first and second motor (101, 102).

The steering assembly (2) installed on and capable of being dissembled from the balance car body (1), comprising a locking part (21) configured to prevent the first and second foot board (11, 12) from rotating around each other, a steering rod (24) installed on the locking part (21), and a sensor assembly (240) disposed at a bottom end of the steering rod (24) and configured to steer the balance car body (1) and be controlled by the steering rod (24), the sensor assembly (240) is electrically connected with the first and the second balance control system (10, 20), thereby moving the steering rod (20) to control the balance car body (1) turning right and left.

Wherein the sensor assembly (240) comprises a first bearing (243) and a second bear (244) installed in a shaft (245) of the locking part by a rotating manner, a connector (246) installed in one end of the shaft (245), and a sensor (247) coupled to the connector (246); the opposite end of the shaft (245) is coupled to a lower end of the steering rod (24). When the steering rod (24) is titled to the right or left, the data being detected from the sensor (247) transfers to the first and the second balance control system (10, 20) which respectively control rotating speed of the first and the second motor (101, 102) to control the balance ear body (1) turning right or left.

wherein the locking part (21) is a fork-shaped metal, two ends of which are inserted into and connected therewith a first metal base and a second metal base respectively installed in the first and second foot board (11, 12) thereby forming a stable connection. Besides, the locking part (21) can be any other form of connector structure, as long as the connector structure can be fixed between the first and second foot board (11, 12) to prevent therebetween from being rotated around each other.

Wherein the steering rod (24) is an extendable rod, which comprises a handlebar (241) disposed in an upper end thereof and configured to control the balance car body (1) with hands. In particular, the balance car body (1) turns right or left by tilting the handlebar (241) to the right or left.

wherein the first foot board and the second foot board respectively comprise a first pressure sensor (110) and a second pressure sensor (120) configured as a start switch; wherein the first foot board (11) comprises a first housing (112) and a first mat (113) fixed on the first housing (112); wherein the first balance control system (10) and the first motor (101) are installed in the first housing (112), and the first pressure sensor (110) is installed on an upper surface of the first housing (112) and is covered thereon by the first mat (113). Besides, the first pressure sensor (110) is electrically connected with the first balance control system (10), by which the first pressure sensor (110) starts the first balance control system (10) to control the balance of the first foot board (11), wherein the second foot board (12) comprises a second housing (122) and a second mat (123) fixed on the second housing (122); wherein the second balance control system (20) and the second motor (102) are installed in the second housing (122), and the second pressure sensor (120) is installed on an upper surface of the second housing (112) and is covered thereon by the second mat (123). Moreover, the second pressure sensor (120) is electrically connected with the second balance control system (20), by which the second pressure sensor (120) starts the second balance control system (20) to control the balance of the second foot board (12).

To sum up, the balance car body (1) can be used without the steering assembly (2) on flat ground, which will bring more fun to users; the balance car body (1) also can be used with the steering assembly (2) to improve the maneuver stability, when using on uneven road. Therefore, the present invention can be based on actual ground situation to use the balance car body (1) independently, or use with the steering assembly (2), thereby conforming with the demand for enhancing economic benefits of products.

The first foot board (11) and the second foot board (12) sense pressure value thereabove through the first and second pressure sensor (110, 120), when the pressure value is beyond the predetermined pressure value of the corresponding balance control system, the corresponding balance control system will be started to work, thereby simplifying the structure of the balance car, reducing cost of manufacture, and increasing operational stability.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An assembled dual-use balance car, comprising:
   a balance car body, comprising a first foot board, a second foot board connected and mutually rotated with the first foot board, a first wheel disposed at one end of the first food board, a second wheel disposed at one end of the second food board, a first motor installed in the first foot board and independently driving the first wheel, a second motor installed in the second foot board and independently driving the second wheel, and a balance control system installed in the first foot board or the second foot board; wherein the balance car body is moved forward, draw back, and turns by tilting the first and second foot board forward and backward, and rotating around each other;
   a steering assembly, installed on and capable of being dissembled from the balance car body, comprising a locking part configured to prevent the first and second foot board from being rotating around each other, a steering rod installed on the locking part, and a sensor assembly disposed at a bottom end of the steering rod and configured as a steering control of the balance car body, the sensor assembly being electrically connected with the balance control system;
   wherein the balance car body can be used independently without the steering assembly, and also can be used together with the steering assembly.

2. The assembled dual-use balance car according to claim 1, wherein the steering assembly further comprises a first holder and a second holder respectively installed in back sides and front sides of the first and second foot board; wherein the steering rod and the locking part are installed on the second holder, and the locking part passes through the first and second foot board, and then is fixed with the first holder.

3. The assembled dual-use balance car according to claim 1, wherein the locking part is a fork-shaped metal, a middle part of which is fixed with the second holder and two ends of which passes through a first metal base and a second metal base respectively installed inside the first and second foot board to connect with the first holder for preventing the first and second foot board from being rotated around each other.

4. The assembled dual-use balance car according to claim 1, wherein the first holder and the second holder respectively comprise at least two fasteners disposed on inner sides thereof; wherein the first and second foot board respectively comprise at least two grooves disposed in the front and back side thereof, and corresponding to the fasteners; the first and second holder are coupled to the first and second foot board via the fasteners fixing in the grooves.

5. The assembled dual-use balance car according to claim 1, wherein the steering rod defines an extendable rod.

6. The assembled dual-use balance car according to claim 5, wherein the steering rod comprises a handlebar installed on an upper end thereof and configured to control the balance car body with hands.

7. The assembled dual-use balance car according to claim 5, wherein the steering rod comprises knee pads disposed in the upper end thereof and configured to control the balance car body with legs.

8. An assembled dual-use balance car, comprising:
   a balance car body, comprising a first foot board, a second foot board connected and mutually rotated with the first foot board, a first wheel disposed at one end of the first food board, a second wheel disposed at one end of the second food board, a first motor installed in the first foot board and independently driving the first wheel, a second motor installed in the second foot board and independently driving the second wheel, a first balance control system installed in the first foot board, and a second balance control system installed in the second foot board; wherein the balance car body is moved forward, draw back, and turns by tilting the first and second foot board forward and backward, and rotating around each other; wherein the first foot board and the second foot board respectively comprise a first pressure sensor and a second pressure sensor configured as a start switch;
   a steering assembly, installed on and capable of being dissembled from the balance car body, comprising a locking part configured to prevent the first and second foot board from being rotating around each other, a steering rod installed on the locking part, and a sensor assembly disposed at a bottom end of the steering rod and configured as a steering control of the balance car body, the sensor assembly being electrically connected with the balance control system;
   wherein the balance car body can be used without the steering assembly, and also can be used together with the steering assembly.

9. The assemble dual-use balance car according to claim 8, wherein the first foot board comprises a first housing and a first mat fixed on the first housing; wherein the first balance control system and the first motor are installed in the first housing, and the first pressure sensor is installed on an upper surface of the first housing and is covered thereon by the first mat.

10. The assemble dual-use balance car according to claim 8, wherein the second board comprises a second housing and a second mat fixed on the second housing; wherein the second pressure sensor and the second motor are installed in the second housing, and the second pressure sensor is installed on an upper surface of the second housing and is covered thereon by the second mat.

* * * * *